United States Patent Office 3,459,953
Patented Aug. 5, 1969

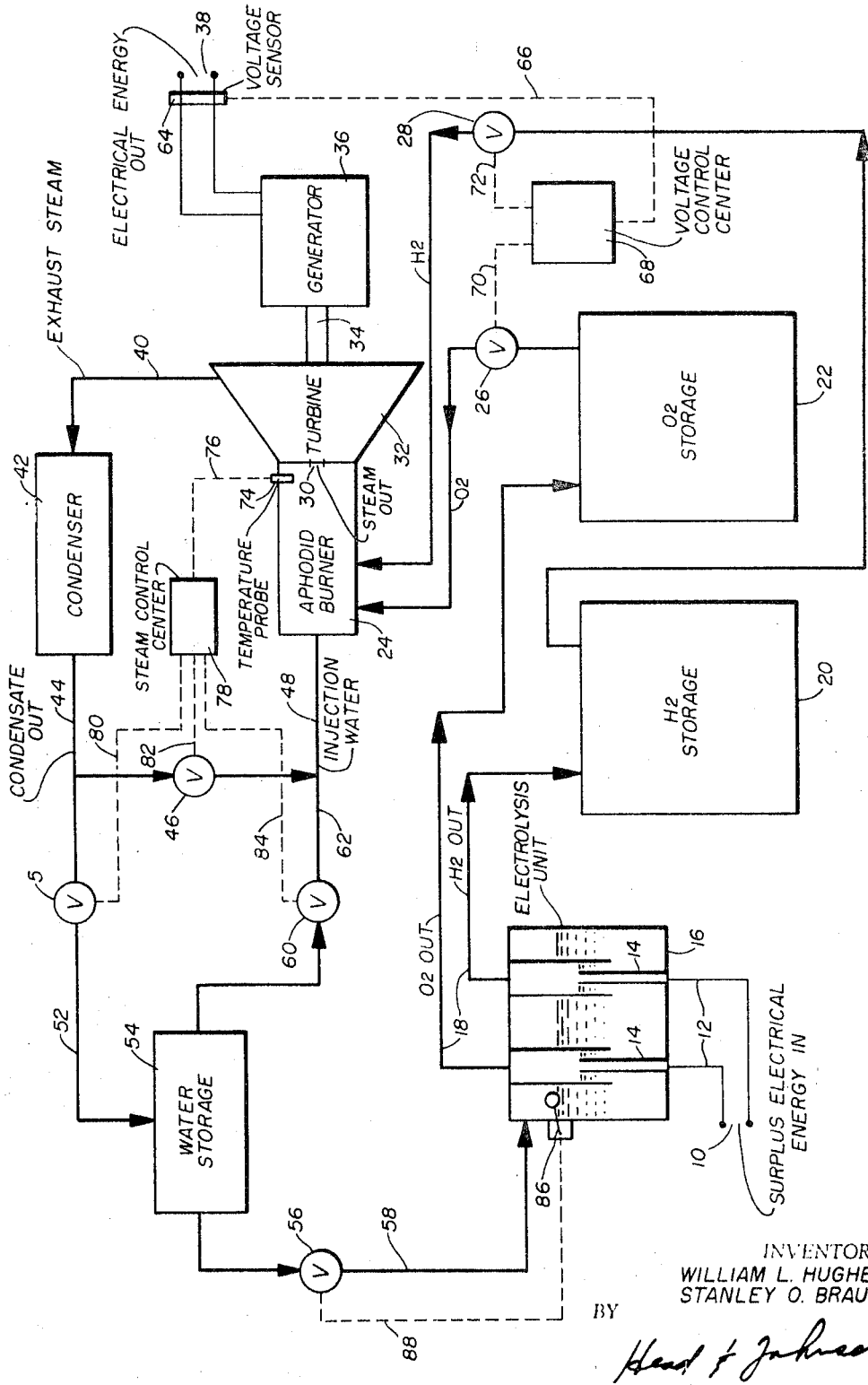

3,459,953
ENERGY STORAGE SYSTEM
William L. Hughes and Stanley O. Brauser, Stillwater, Okla., assignors to Oklahoma State University, Stillwater, Okla., a corporation of Oklahoma
Filed Mar. 20, 1967, Ser. No. 624,276
Int. Cl. F01k 17/02
U.S. Cl. 290—2                                8 Claims

ABSTRACT OF THE DISCLOSURE

This invention provides a system for storing surplus electrical energy and for generating electrical energy from such stored surplus as conditions require. The system includes an electrolysis unit wherein surplus electrical energy is utilized to generate hydrogen and oxygen from water. The hydrogen and oxygen are separately stored under pressure. When energy is required from the system the hydrogen and oxygen are reacted to produce superheated steam in an aphodid burner. Steam from the burner is connected directly to a turbine which drives a generator. By a condenser system the exhaust steam from the turbine is condensed into water and a portion of the water reinjected into the aphodid burner to control the temperature of the steam entering the turbine. The other portion of the water from the condenser is being returned to a water storage container for usage to maintain the water level in the electrolysis unit. The system may be arranged to be completely closed.

SUMMARY OF INVENTION

A great economic problem in any electrical generating system is that of meeting peak demand which varies considerably according to the time of day and the season of the year. In order to satisfy customer requirements the generating system must be designed to supply peak loads. This means that the generating machinery is utilized at only partial capacity most of the time and therefore the investment in such machinery and equipment is normally idle.

Various means have been devised for storing surplus energy including hydroelectric pump-back systems wherein surplus electrical energy is utilized to pump water to a higher elevation. During peak loads the water is returned through a generating system to supply the peak load requirements. This system is effective but requires a high capital investment.

It has been determined that the electrical energy required to supply all of the demands of a typical household could be obtained by direct sunlight. One great problem, however, is that no satisfactory storage means has been devised to provide the electrical energy during nighttime hours and during cloudy days. The wind is a good source of electrical energy through usage of wind driven generators, however, again the problem is storing the energy for use during calm periods.

This invention solves the problem of storing energy through an arrangement wherein surplus electrical energy is utilized in an electrolysis unit to produce hydrogen and oxygen from water, which are separately stored in high pressure storage systems. When energy is required from the system the hydrogen and oxygen are reacted in an aphodid burner, generating superheated steam. Steam is fed directly into a turbine which drives a generator providing the electrical energy output. A condensing system is utilized to condense the exhaust steam from the turbine, a portion of the condensate being returned to the aphodid burner for reducing the steam output to a predetermined temperature level. The excess portion of the water from the condensation system is returned to a water storage system for use in maintaining a level of water in the electrolysis unit so that the entire system may be completely closed.

CROSS-REFERENCE

This is an original application and not related to a pending application.

DESCRIPTION OF VIEWS

The drawing is a diagrammatic illustration of the basic elements of the energy storage system of this invention. Gas and liquid lines are shown solid and control conductors are shown in dotted lines.

DETAILED DESCRIPTION

Surplus electrical energy from any electrical source is fed to the system at energy input points 10, and by way of conductors 12 to electrodes 14 to a water containing electrolysis unit 16. Hydrogen and oxygen are released through the electrolysis process in the unit 16 and carried out by pipes 18. Hydrogen is stored in a high pressured storage chamber 20 and oxygen is stored in the high pressured oxygen storage chamber 22. The hydrogen and oxygen are stored at high pressures in order to concentrate the stored energy in a reasonable space requirement; therefore, the hydrogen and oxygen may be compressed by pump arrangement (not shown) after these gases leave the electrolysis unit or the electrolysis unit may operate at a high pressure so that no compression system is required between the unit and the storage chamber. Check valves as well as control valves will normally be utilized in lines 18, although they are not shown since their usage will depend upon the selection of design parameters.

To recover the energy stored in the form of hydrogen and oxygen in chambers 20 and 22 gases therefrom are conveyed to an aphodid burner 24. Aphodid burner as used herein means a burner adapted for the reaction of hydrogen and oxygen in a closed environment to produce steam, including means of regulating the heat of reaction by water injection. Valve 26 controls the rate of oxygen going to the burner and likewise a valve 28 controls the rate of flow of hydrogen to the burner.

In the aphodid burner 24 the hydrogen and oxygen are united, directly creating superheated steam. The steam passes through a steam outlet 30 directly into a turbine 32 to drive an output shaft 34 which in turn rotates a generator 36. The electrical energy output of the generator is obtained at energy output points 38. Thus, surplus energy is fed in at points 10 and recovered as required at points 38.

Steam leaving the turbine 32 flows through exhaust conduit 40 to a condenser 42 where it is cooled to condensate. The condenser 32 thereby functions to reduce the exhaust pressure and improve the efficiency of turbine 32. Condensate flows from condenser 42 through condensate outlet conduit 44. A portion of the condensate passes through valve 46 and conduit 48 to be injected into the aphodid burner 24. By controlling the amount of water injected through conduit 48 into aphodid burner the surplus heat produced by the reaction of hydrogen and oxygen in the burner is used to convert the injected water into steam, thereby increasing the total steam generating capacity of the aphodid burner and reducing the temperature of the steam as it passes through the steam outlet 30 into the turbine to a preselected level.

The balance of the condensate from conduit 44 flows through valve 50 and conduit 52 to a water storage chamber 54. Water required to maintain the necessary level in electrolysis unit 16 is supplied from the water storage chamber 54 through valve 56 and conduit 58. If additional injection water is required in the aphodid burner during certain phases of operation of the system, such as during the start-up phase, such water may be supplied from water storage system 54 through valve 60 and conduit 62.

Various controls are utilized to maintain the balance of the system and such controls are shown in the drawing in rudimentary form. The electrical voltage level output 38 includes a voltage sensor 64 which detects the voltage output level and, by means of conductor 66 and a voltage control center 68, and conductors 70 and 72, control the oxygen valve 26 and hydrogen valve 28. Thereby in response to voltage requirement at output points 38, the quantity of oxygen and hydrogen being supplied to the aphodid burner is regulated to maintain a level voltage output of the system.

A steam temperature probe 74 is positioned to detect the temperature of a steam passing through steam outlet 30, probe 74 supplies a signal through conductor 76 to a steam control center 78 which in turn, by way of conductors 80, 82 and 84, control valves 46, 50 and 60 so that the proper amount of water is injected into the aphodid burner to maintain the temperature of the stream passing to the turbine 32 at a preselected level.

The level of water in the electrolysis unit 16 is detected such as by means of a water level float 86 which, by way of conductor 88, controls valve 56 to maintain the water in the electrolysis unit at a predetermined level.

The control system is, as previously mentioned, of rudimentary arrangement and is included only to illustrate basic means whereby the energy storage system of this invention functions to maintain a voltage level output as required. Various pressure devices which may be required according to specific designs are not shown. For instance, if the electrolysis unit 16 is operated at a high pressure a water injection pump may be required to inject water from storage system 54 through valve 56 and conduit 58 into the unit. In like manner, injection pumps will normally be required to maintain the injection pressure of the oxygen and hydrogen from the storage system into aphodid burner at a predetermined level. Water injected into the aphodid burner 24 through conduit 48 will normally require an injection pump. The application of these and other similar devices is all within the skill of the art and the requirement thereof will be determined by the design incorporating the principles of the invention.

In the preferred arrangement the system is closed. That is, the entire liquid and gas handling systems are closed and absence leakage, require no water make-up.

When the system is closed it can be seen that as energy is stored the amount of water in storage 54 diminishes and the amount of hydrogen and oxygen in chambers 20 and 22 increases. Thus, the balance of stored hydrogen, oxygen and water always remains the same. As the stored energy of the system is diminished the amount of water in storage 54 increases.

This invention has been described with a certain degree of particularity. It is understood that the invention is not limited to the specific disclosure which is incorporated as an exemplification of one embodiment of the invention, nor by the abstract, nor the summary of the invention, but the invention includes all those arrangements and their equivalents encompassed within the scope of the claims.

What is claimed:
1. An energy storage system comprising:
  an electrolysis device having means to receive electrical energy input and for utilization of such energy to generate, from water, hydrogen and oxygen;
  means of separately storing the hydrogen and oxygen generated in said electrolysis device;
  an aphodid burner having connection to receive oxygen and hydrogen from said storage means and wherein the oxygen and hydrogen are reacted to produce steam;
  a turbine having connecting to receive steam from said aphodid burner; and
  an electrical generator connected to and rotated by said turbine for the generation of electrical energy.

2. An energy storage system according to claim 1 including a condenser connected to receive steam out of said turbine to reduce the output pressure of the turbine and thereby improve the work producing capacity thereof, and to convert the steam received from said turbine into water, and including connecting means whereby a portion of said water is conveyed to said electrolysis device for conversion to hydrogen and oxygen, and a portion is conveyed to said aphodid burner for conversion by the heat of reaction of said hydrogen and oxygen into steam.

3. An energy storage system according to claim 2 including a water storage means receiving a portion of the water output of said condenser and including outlet means for controllably supplying water to said electrolysis device.

4. An energy storage system according to claim 3 wherein all of elements thereof are confined in a closed system.

5. An energy storage system comprising:
  an electrolysis means for converting water into hydrogen and oxygen by use of electrical energy;
  storage means for separately storing hydrogen and oxygen generated in said electrolysis means;
  an aphodid burner having connection to said hydrogen and oxygen storage means for reacting hydrogen and oxygen therein to provide heat and steam;
  a turbine having connection to said aphodid burner to receive the steam output thereof;
  a generator connected to and driven by said turbine to provide electrical energy output;
  a condenser having connection to receive the exhaust steam from said turbine and to convert the same to water;
  means of conducting a portion of the water condensed in said condenser into said aphodid burner to be converted therein to steam;
  a water storage means having connection to receive at least a portion of the water condensed in said condenser; and
  means conducting water from said water storage means to said electrolysis unit.

6. An energy storage system according to claim 5 including means of supplying water from said water storage means to said aphodid burner.

7. An energy storage system according to claim 5 including means of controlling the rate of water injected into said aphodid burner in response to the temperature of the steam output thereof to control the steam output temperature of the aphodid burner.

8. An energy storage system according to claim 5 including means responsive to the voltage level output of said generator to control the rate of input of oxygen and hydrogen into said aphodid burner to maintain a preselected voltage output of said generator.

References Cited

UNITED STATES PATENTS 2,036,613   4/1936   Stuart _____ 290—1
2,098,629   11/1937  Knowlton.

ORIS L. RADER, Primary Examiner

G. R. SIMMONS, Assistant Examiner

U.S. Cl. X.R.

60—203; 204—129; 290—52